United States Patent [19]

Kittle

[11] Patent Number: 5,096,616
[45] Date of Patent: Mar. 17, 1992

[54] METHOD OF PROVIDING A FOAM BARRIER BETWEEN A SUBSTRATE AND THE ATMOSPHERE AND COMPOSITIONS THEREFOR

[75] Inventor: Paul A. Kittle, West Chester, Pa.

[73] Assignee: Rusmar Incorporated, West Chester, Pa.

[21] Appl. No.: 414,688

[22] Filed: Sep. 29, 1989

[51] Int. Cl.⁵ ............... B01J 13/00; B09B 1/00; B01F 17/02; C11D 9/32
[52] U.S. Cl. .................... 252/307; 252/354; 252/3; 252/8.05; 252/121; 252/174.24; 71/900; 405/129
[58] Field of Search ............... 252/307, 3, 8.05, 354, 252/121, 174.24, 549; 405/129; 71/900

[56] References Cited

U.S. PATENT DOCUMENTS

| | | | |
|---|---|---|---|
| 2,167,180 | 7/1939 | Kritchevsky | 252/355 X |
| 2,748,078 | 5/1956 | Perri et al. | 252/8.05 |
| 2,758,969 | 8/1956 | Perri et al. | 252/3 |
| 2,945,322 | 7/1960 | Gaeth et al. | 252/8.05 X |
| 3,466,873 | 9/1969 | Present | 405/128 |
| 3,713,404 | 1/1973 | Lavo et al. | 252/307 X |
| 3,954,662 | 5/1976 | Salyer | 252/307 X |
| 4,050,944 | 9/1977 | Cartwright | 252/307 X |
| 4,118,526 | 10/1978 | Gregorian et al. | 252/307 X |
| 4,342,665 | 8/1982 | Itoh et al. | 252/3 X |
| 4,417,016 | 11/1983 | Cline et al. | 252/307 X |
| 4,421,788 | 12/1983 | Kramer | 405/129 X |
| 4,442,018 | 4/1984 | Rand | 252/307 |
| 4,519,338 | 5/1985 | Kramer | 405/128 X |
| 4,610,311 | 9/1986 | Bronner et al. | 252/8.05 X |
| 4,849,117 | 7/1989 | Bronner et al. | 252/307 X |
| 4,874,641 | 10/1989 | Kittle | 405/129 X |
| 4,990,373 | 2/1991 | Kittle | 252/307 X |

Primary Examiner—Robert L. Stoll
Assistant Examiner—Daniel S. Metzmaier
Attorney, Agent, or Firm—Howson & Howson

[57] ABSTRACT

Aqueous thixotropic foam-producing chemical compositions are presented which are comprised of an anionic sulfonate or sulfate surfactant, a fatty acid having 10-30 carbon atoms, an acrylic-based thixotropic thickener, an acrylic acid polymer processing aide and a base present in a concentration sufficiently high to neutralize all of the acid components of the mixture and adjust the pH to above 7.5. The thixotropic foam-producing compositions are useful for producing thixotropic foams which have the ability to resist slumping on sloped surfaces. Also disclosed is a process for mixing highly viscous, low density chemical foaming compositions with water without causing foaming of the resulting mixture.

26 Claims, 1 Drawing Sheet

METHOD OF PROVIDING A FOAM BARRIER BETWEEN A SUBSTRATE AND THE ATMOSPHERE AND COMPOSITIONS THEREFOR

FIELD OF THE INVENTION

The present invention relates to aqueous foamable compositions and more particularly to aqueous compositions from which can be prepared long lasting foams. The invention also relates to a method of insulating a substrate from the atmosphere by applying a coating of foam to the substrate.

BACKGROUND

This invention has application in several fields, as discussed below. However, since it is particularly suitable for waste disposal and hazardous waste landfill it will be described in detail with particular reference to landfill applications.

All states require a daily cover over trash being placed in a sanitary landfill. This is accomplished by the application of cover material, usually soil, at the end of each day. The general requirement for this daily cover is six inches of soil, although thinner sections of alternate covers can be used. In some states the regulations even require alternate covers to be six inches thick.

In the past, soil has been used in most instances as a cover material. It can readily be appreciated that certain disadvantages attend the use of soil as a daily waste cover. In the first place, when soil is used, there is a continuing need to have sufficient soil available to meet the requirements of daily cover. Secondly, and more importantly, the use of soil layers at the above-noted thicknesses results in the rapid depletion of disposal space in the landfill. Most states permit the use of a foam material for a daily cover in landfill operations in place of soil, provided that the foam material meets certain requirements, e.g., it must be effective to seal off odors from, and prevent insects from gaining access to, the waste. Furthermore, it must be inoccuous to the environment.

Recently, surfactant-based foams have been developed for daily cover of waste and landfill operations. These foams have the advantage over soil cover that they will collapse when additional waste is deposited on top of the foam, therefore they do not consume valuable landfill volume. Currently available foams, however, are not suitable for use as landfill cover when the slope of the landfill surface is greater than about 30 degrees and the section thickness is greater than 3 to 4 inches. These foams tend to "cold flow" down the slope at these conditions.

The two-part hardening foams described in U.S. Pat. Nos. 2,945,322 and 4,519,338 do not satisfy the above conditions since they can not be deposited at the required six inch thickness.

The increasingly stringent requirements of state and Federal environmental agencies and the growing shortage of useable waste disposal landfill volume, have given impetus to a continuing search for materials that meet the above criteria for suitable daily waste landfill cover without having the above-noted disadvantages

OBJECTS OF THE INVENTION

It is an object of the invention to present novel foam producing compositions. It is another object of the invention to present foam producing liquids and concentrates which can be easily pumped. It is another object of the invention to present improved aqueous foam producing compositions. It is another object of the invention to present aqueous foams having improved stability on slopes. It is another object of the invention to present improved aqueous foams which have high profile stability. It is another object of the invention to present thixotropic foams which can be easily pumped and which develop a firm structure upon standing. It is another object of the invention to present a method of covering steeply inclined substrates with foam. It is another object of the invention to present a method of covering a substrate with an exceptionally thick layer of foam. It is another object of the invention to present apparatus for mixing a thixotropic foam composition with water. It is another object of the invention to present a method of mixing a highly viscous thixotropic foam composition with water. These and other objects of the invention will become obvious from the following description and examples.

SUMMARY OF THE INVENTION

The above objects are attained by the unique thixotropic composition of the invention, by the disclosed method of mixing a thixotropic composition with water and by the described method of providing an odor and sight barrier between a substrate and the environment surrounding it.

According to one aspect of the invention, novel thixotropic water-based foam-producing chemical compositions, which are very thick when left undisturbed but which can be pumped with relative ease, have been discovered. The novel aqueous thixotropic compositions of the invention are comprised of an anionic sulfonate- or sulfate-based surfactant, a fatty acid, a thixotropic thickener, an acrylic acid polymer and a base. The composition optionally contains a water softening agent.

Preferred anionic surfactants are the alkyl, alkylene, alkaryl and alkylpolyether sulfonates and sulfates; the preferred fatty acids are those having 14 to 18 carbon atoms; the preferred thixotropic thickeners are those comprised of acrylic acid-alkoxylated methacrylic esters; and the preferred bases are the alkanolamines.

The foam-producing compositions of the invention are preferably prepared as concentrates and mixed with water for use in foaming operations. The mixing is accomplished by combining the concentrate and water in a circulating system and forcing the mixture through a conduit having a small cross-sectional area at a relatively high linear velocity. To avoid premature foaming, the mixture is discharged from the small cross-sectional area conduit into one having a larger cross-sectional area, thereby reducing its velocity prior to its reintroduction into the main body of water contained in the mixing vessel.

DETAILED DESCRIPTION OF THE INVENTION

Figure 1:
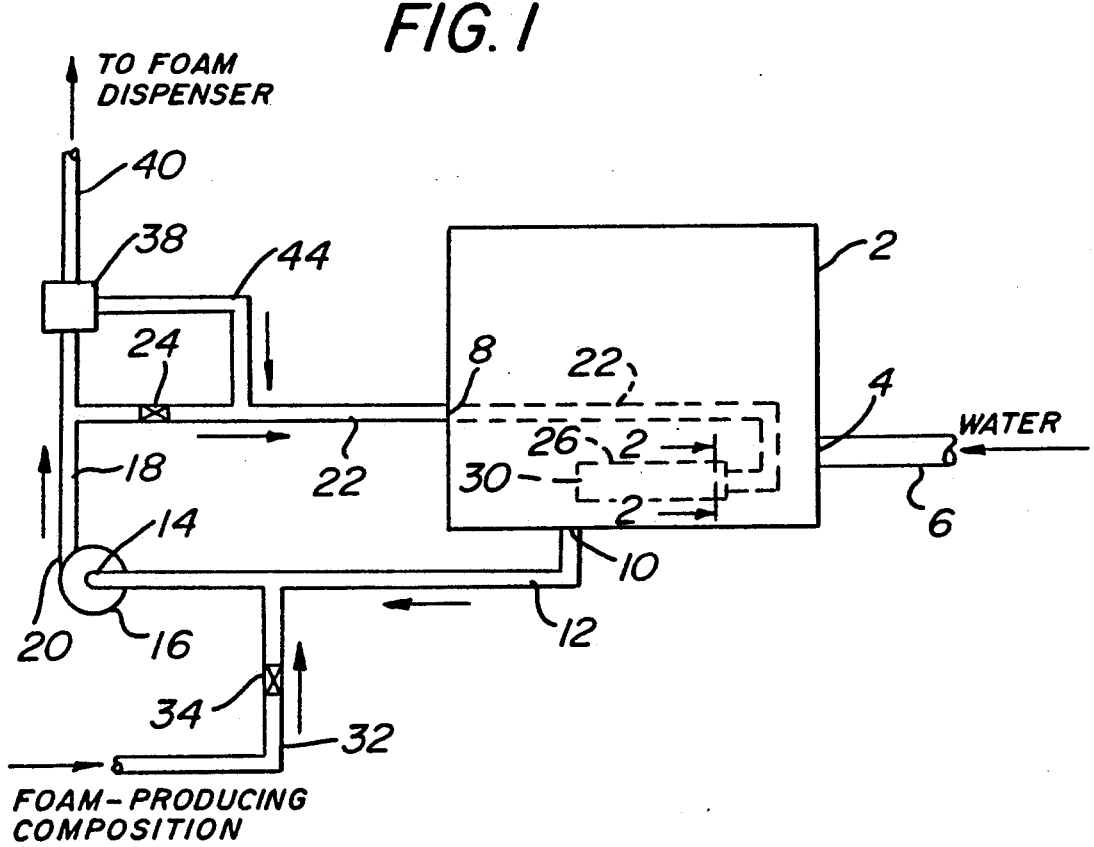
FIG. 1 is a schematic view of a system for mixing high viscosity chemical foaming agent with water.
Figure 2:
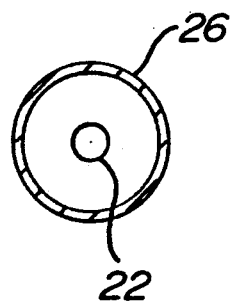
FIG. 2 is a sectional side elevation of a portion of the system taken along the line 2—2 of FIG. 1.

In the following description the concentration of each of the components other than water is expressed on a dry weight basis, i.e. the weight percentage of each of these components in the formulation is based on the total dry weight of all of the components in the composition except free water. Free water, for purposes of this description, is defined as water which is solvent.

The anionic surfactant used in the composition of the invention may be any water-soluble anionic sulfonate or sulfate surfactant which when mixed with water can be converted into foam. Sulfonates and sulfates are specified because of their excellent foam producing qualities, low cost and ready availability.

Sulfonates preferred for use in the invention are those having the structural formula:

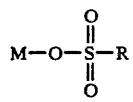

where M is a monovalent cation and R is a hydrocarbon radical selected from alkyl, alkenyl and alkaryl radicals.

M may be an alkali metal ion, the ammonium ion or alkyl-substituted or hydroxyalkyl-substituted ammonium. When M is an alkali metal it is preferably sodium, potassium or lithium. When M is an alkyl or hydroxyalkyl group-substituted ammonium, it generally has up to six, and preferably up to 3 carbon atoms. Preferred alkyl groups include methyl, ethyl, isopropyl, etc. radicals. Preferred hydroxyalkyl groups include hydroxyethyl, hydroxypropyl, etc. radicals. Examples of preferred substituted ammonium radicals are mono-, di- and tri-alkyl ammonium radicals containing 1-3 carbon atoms in each substituent group, and mono-,di- and trialkanolammonium groups having 2-3 carbon atoms in each substituent. Particularly preferred substituted ammonium groups are mono-, di- and triethanolammonium radicals.

R is generally an alkyl, alkenyl or alkaryl radical having 10-20 carbon atoms. Typical R substituents include alkyls, such as decyl, dodecyl, tetradecyl, hexadecyl, octadecyl, etc.; alkenyl groups, such as 1-dodecenyl, 1-tetradecenyl, 2-hexadecenyl, etc.; and alkaryl groups such as dodecylbenzenene, isopropylnaphthalene, etc.

Sulfonate surfactants which are desirable for use in the invention include potassium dodecyl sulfonate, sodium 1-dodecenyl sulfonate, sodium dodecylbenzenene sulfonate, ammonium isopropylnapthalene sulfonate etc. The preferred sulfonate for use in the invention is sodium alpha-olefin sulfonate, a mixture comprised substantially of $C_{12}$ and $C_{14}$ alpha-olefin radicals. This compound has been found to produce stiff and slow-draining foams.

Sulfates suitable for use in the invention are those having the structural formula:

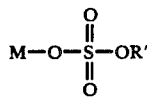

where M is as defined above and R' is an alkyl, alkenyl, alkaryl or an alkylpolyether radical. Where R' is an alkylpolyether group it has the structure:

wherein R" is an alkyl group containing 10-20, and preferably 12-16 carbon atoms, R''' is H or an alkyl group containing up to 3 carbon atoms and n is an integer of 1-12. R''' is preferably H or the methyl radical and n is preferably 3-6.

Typical R' constituents include alkyls, such as decyl, dodecyl, tetradecyl, hexadecyl, octadecyl, etc.; alkenyl groups, such as 1-dodecenyl, 1-tetradecenyl, 2-hexadecenyl, etc.; and alkaryl groups such as dodecylbenzene, isopropylnaphthalene, hexadecyltetraethoxy, etc.

Sulfate surfactants which are desirable for use in the invention include alkyl sulfates, such as sodium lauryl sulfate; alkenyl sulfates, such as potassium 1-dodecenyl sulfate: alkaryl sulfates, such as ammonium dodecylbenzene sulfate; and alkylpolyether sulfates, such as sodium octodecyltetraethoxy sulfate. The preferred sulfates are the alkylpolyether sulfates Mixed sulfonates and/or sulfates, i.e. mixtures of sulfonates or mixtures of sulfates or mixtures of sulfonates and sulfates having different substituents may also be used in the invention.

For some applications, it may be desired to use sulfonates and/or sulfates having, as the R or R' substituent, a heteroatom-containing radical. In addition to carbon and hydrogen atoms, oxygen may be present in the form of carboxyl, ester or ether groups.

The anionic surfactant may be present in the compositions of the invention at concentrations in the range of about 10-30 percent, and preferably about 15-25 percent, based on the total dry weight of the composition.

The fatty acid component functions in combination with the surfactant to provide the foaming activity of the compositions of the invention. Fatty acids useable in the invention may be any of those having about 8 to about 30 carbon atoms. However, the fatty acids generally chosen for use in the invention have 10-20 carbon atoms and preferably 14-18 carbon atoms. Typical fatty acids desirably used in the invention include decanoic acid, lauric acid, myristic acid, palmitic acid, stearic acid, etc. The preferred fatty acids are myristic acid, palmitic acid and stearic acid. Combinations of fatty acids having carbon contents within the above range may also be used in the invention. A particularly preferred fatty acid is commercial grade stearic acid which is a mixture of fatty acids, and predominantly a mixture of palmitic acid and stearic acid. An example of a suitable commercial grade stearic acid is triple pressed stearic acid sold by Union Camp Company under the designation Century 1240.

The fatty acid is generally present in the compositions of the invention at concentrations of at least 5% and may be present in amounts as high as 30%, based on the total dry weight of the composition. The fatty acid concentration is preferably in the range of about 5 to about 25 weight percent and most preferably in the range of about 10-20 weight percent based on the total dry weight of the composition.

The thixotropic thickening agent is present to impart to the composition the ability to produce a thixotropic foam, i.e. one which can be easily pumped but which will not flow or sag significantly upon standing. In general, any of the thixotropic polymer thickeners available on the market can be used in the invention. However, the preferred thixotropic agents are those which contain a significant amount of acrylic structure and which are soluble in aqueous alkaline solutions. Thixotropic thickeners which have been found particularly suitable for use in the invention are the copolymers of acrylic acid and acrylic esters. A preferred acrylic polymer thickening agent is a copolymer of acrylic acid and methacrylic ester, such as alkoxolated methacrylic ester. The most preferred thixotropic thickeners are those comprised of acrylic acid and ethoxylated methacrylic ester in which the ester moiety has about 12-20 ethoxy groups and the ethoxy linkage is terminated by an alkyl group having 12-20 carbon atoms. The molar ratio of acrylic acid units to ethoxylated methacrylic ester units in these compositions is desirably in the range of 6-10:1. A commercially available thixotropic thickener having the above description is Acrysol™ ICS-1.

The thixotropic thickener is present in the compositions of the invention at a relatively high concentration. It generally comprises at least 5, and can comprise as much as 25 weight percent, based on the total dry weight of the composition. In preferred embodiments of the invention the thixotropic thickener is present at a concentration in the range of about 10-20 weight percent, based on the total dry weight of the composition.

An important component of the compositions of the invention is the acrylic acid polymer. Although the function and manner of operation of this component are not completely understood, it appears that the acrylic acid polymer serves as a processing aid and makes it possible to incorporate very high concentrations of the thixotropic thickener into the formulation without forming a gel. Preferred acrylic acid polymers include polyacrylic acid homopolymer and acrylic acid copolymers in which acrylic acid is present as the major constituent. Polyacrylic acids found suitable for use in the invention are those having moderate molecular weights, i.e. those in the range of about 30,000-100,000 as determined by weight average techniques, and preferably in the range of about 40,000-70,000. The most preferred polyacrylic acids have weight average molecular weights in the range of about 50,000-60,000.

The acrylic acid polymer is generally present at a concentration of about 5-20 and preferably about 5-15 weight percent, based on the total dry weight of the composition.

The base present in the composition also plays a very important role. Since the components of the invention perform in the alkaline pH range, it is necessary to add sufficient base to neutralize the acidic components, i.e. the acid function of the fatty acid, the thixotropic thickener and the acrylic acid polymer.

The base may be any water soluble base which will not adversely effect the performance of the composition. Suitable bases are the water-soluble monovalent bases, including alkali metal hydroxides, ammonium hydroxide, amines and alkanolamines. Useable bases include sodium hydroxide, potassium hydroxide, lithium hydroxide, ammonium hydroxide, primary, secondary, and tertiary amines in which the alkyl groups have 1-3 carbon atoms, and mono- di-, and trialkanol amines having 2-3 carbon atoms in each alkanol group. Examples of suitable amines include methyl amine, diethylamine, triethylamine, isopropylamine, butylamine, etc. Examples of alkanol amines useable in the invention include diethanolamine, triethanolamine, monoisopropanolamine, etc. Mixtures of these compounds may also be used in the invention. The preferred bases for use in the invention are ammonium and the lower alkanolamines such as mono-, di-, and triethanolamines. These are preferred because of their low cost and wide range of solubilities in aqueous systems. Particularly preferred bases include triethanolamine and a mixture containing 75-95 weight percent of triethanolamine and 5-25 weight percent of diethanolamine.

The base is generally present in a amount sufficient to neutralize all of the acid components in the formulation and raise the pH of the composition to a value of at least about 7.5 and preferably to a value of about 8-10.

The water available for dilution of the foam producing concentrates is often hard due to the presence of calcium and magnesium salts. In such cases it is desirable to include a water softening agent in the composition to control hardness. Although any of the common water softening agents may be used it has been found that polyphosphates salts are highly suitable for use in the compositions of the invention. Preferred polyphosphate salts are the alkali and ammonium polyphosphate salts. A particularly preferred softening agent is potassium tri-polyphosphate, because of its ability to function at low temperatures, such as those encountered in winter operations using cold water. The amount of water softening agent will depend upon the hardness of the water being used to produce the foam. The softening agent is generally present in an amount sufficient to substantially eliminate the hardness of the water.

It is often desirable that the foam layer visually blend in with the environment in which it is applied. In such situations it may be desirable to incorporate small amounts of carbon black into the composition. This will result in the formation of a foam which will vary in color from off white to dark gray, depending on the amount of carbon black employed. Amounts of carbon black in the range of about 0.01 to about 2% based on the total weight of the composition have been found generally suitable.

Water is used as the solvent for all of the components of the invention. In producing the concentrate it is usually preferable to avoid incorporating unnecessarily large amounts of water into the formulation as this increases the storage and transportation costs. In the concentrated formulations, water is generally present in amounts of about 40-90 percent based on the total weight of the concentrate. In diluting the concentrate for use in foam generating applications, sufficient water is added to the concentrate to produce a composition desirably containing about 95 to about 99 weight percent water and about 1 to about 5 weight percent non-water components.

The compositions of the invention can be foamed to a stiff foam having a slow drainage rate. The foams are particularly suitable for use on slopes because they resist slumping after they are deposited on the surface of the slope. The superior properties of the compositions of the invention are due to the unique combination of components in the composition and their relatively high concentration.

It can be appreciated that it may be very difficult to mix the foam concentrate of the invention with water since the concentrate is very viscous and somewhat lower in density than water. Because of its low density it will float on water and therefore presents the problem that it cannot be easily mixed with conventional agitation without causing foaming of the mixture. The mixing system illustrated in the drawings which represents another embodiment of the invention, shows a preferred procedure for mixing the foam concentrate and water without causing excessive foaming of the mixture.

The drawings illustrate equipment and a system for mixing the chemical foaming agent of the invention with water and for discharging the foamable mixture to foaming equipment. In the drawings, vessel 2 is a mixing tank equipped with an inlet for introducing water into vessel 2 via line 6, a recirculating liquid inlet 8 for introducing mixed water and foam-producing composition to vessel 2, and an outlet 10 for discharging the contents of vessel 2 into line 12. Line 12 is in turn connected to the suction end 14 of high pressure pump 16. High pressure pump 16 discharges fluid into line 18 through pump discharge 20. Line 18 communicates with line 22 through valve 24. Line 22 in turn is connected to recirculating liquid inlet 8 of vessel 2. Inside of vessel 2, line 22 communicates with larger conduit 26 through opening 28 at the terminal end of line 22. Conduit 26 has an opening 30 for reintroducing the thoroughly mixed water-foaming agent mixture into vessel 2. Line 12 is also provided with a chemical foaming agent inlet line 32 which is fitted with a valve 34. Downstream of pump 16, line 18 communicates with flow regulator 38. Flow regulator 38 in turn communicates with foamable liquid discharge line 40. A recirculating line 44 connects regulator 38 with line 22.

In producing a diluted foamable composition, vessel 2 is filled with fresh water to the desired level via line 6. Valve 24 is opened, and pump 16 is started, thereby causing circulation of the fresh water through the system. Valve 34 is then opened and foaming agent is introduced into the system through line 32.

Figure 3:
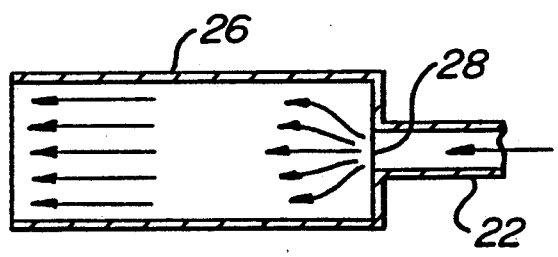
FIG. 3 is a sectional view of the discharge conduit contained in the vessel shown in FIG. 1.

The fresh water and foaming agent are vigorously mixed due to the high shear rate resulting from pumping the mixture through lines 12, 18 and 22, which have small cross-sectional areas relative to the pumping capacity of high pressure pump 16. By the time the water-foaming agent mixture reaches large conduit 26 it is thoroughly mixed. The mixture is discharged from line 22 into conduit 26 through opening 28. The cross-sectional area of conduit 26 is much larger than the cross sectional area of line 22 resulting in a significant drop in the velocity of the mixture. Conduit 26 provides a quiescent zone to enable the water-foaming agent mixture to enter vessel 2 via opening 30 without foaming. FIG. 3 illustrates the flow characteristics of the water-foaming agent mixture in conduit 26.

When the water-foaming agent mixture is thoroughly mixed it can be discharged from vessel 2 to the foam producing equipment via line 40 by closing valve 24. If desired, the water-foaming agent mixture can be recirculated from the flow regulator through line 44 to line 22 and back to vessel 2.

The system illustrated in the drawings provides an efficient way of mixing low density, viscous foam-producing compositions with dilution water without causing foaming of the mixture.

The compositions of the invention have many applications. They can be used for applying layers of foam to flat or sloping surfaces or to waste disposal landfills containing many irregular shaped objects. The foam may also be used as a mulch to protect tender plants during cold weather. Foam produced from the composition of the invention can also be used for safety applications such as the provision of protective layer of foam over a dangerous liquid spill.

The following example illustrates a specific embodiment of the invention. Unless otherwise indicated, parts and percentages are on a weight basis.

EXAMPLE

To 9000 grams of water which was heated to 65° centigrade was added 280 grams of potassium tripolyphosphate. Gentle stirring was initiated and 1428 grams of stearic acid (sold by Union Camp Company under the designation Century 1240) was introduced to the mixing vessel. The stearic acid readily melted in the hot water. Next, 3020 grams of triethanolamine was added to the mixture. This amount was sufficient to neutralize the stearic acid and the other acidic components of the mixture. Next, 300 grams of alpha-olefin sulfonate (sold by Witco Chemical Company under the designation Witconate AOS) and 3176 grams of polyacrylic acid (sold by Rohm and Haas Company under the designation Acrysol A-1) were added to the mixture. Separately, 3640 grams of Acrysol ICS-1 was added to 3491 grams of water and the resulting mixture was slowly added to the primary mixture with continued agitation. The mixture immediately began to thicken and the viscosity continued to increase as the Acrysol ICS-1 was added. The agitator speed was increased in order to achieve uniform mixing. The resulting composition had a pH of 9.3 at 17° centigrade and a viscosity of 1700 CPS, measured at 60 RPM at 21° C. This composition, which amounted to 28 kilograms, was further diluted with 252 kilograms of room temperature water with continued mixing to assure homogeniety. The final solution had a pH of 9.1 measured at 21° C., and a viscosity of 4800 CPS, measured at 6 RPM and 21° C.

Foam made from the above solution by means of a laboratory pneumatic foam generator was applied to a test slope having a grade of about 45°. The foam was applied at a thickness of about 6 inches. The foam was examined after 8 hours and found to have undergone very little drainage and minimal cold flow.

The above example illustrates the superior properties of foam produced from a composition of the invention. As indicated above, the foam showed very little tendency for drainage and easily maintained a thickness of about 6 inches over a period of time.

Variations of the above embodiment are contemplated. For example, other components can be included in the foaming agent and the foaming agent can be used for applications other than covering steeply sloped surfaces. The scope of the invention is limited only by the breadth of the appended claims.

What is claimed is:

1. A method of forming a temporary barrier layer between a substrate and the atmosphere, where the substrate is a body of waste material, a liquid spill, or a plant requiring protection, comprising the steps of: diluting with water a formulation comprising a dry basis:
   a. about 10 to about 30 weight percent of at least one water-soluble anionic sulfonate or sulfate surface active agent;
   b. about 5 to about 30 weight percent of a fatty acid component comprising at least one fatty acid having 10 to 20 carbon atoms;
   c. about 5 to about 25 weight percent of a copolymer of acrylic acid and an ethoxylated methacrylic ester, d. about 5 to about 20 weight percent of an acrylic acid homopolymer, having an average molecular weight in the range of 30,000 to 100,000; and e. sufficient base to adjust the pH of the aqueous formulation to a value of at least 7.5; and forming the diluted formulation; and applying the foam thus formed, as a temporary covering, to the substrate.

2. The method of claim 1 wherein the fatty acid component comprises at least one fatty acid having 14-18 carbon atoms.

3. The method of claim 1 wherein the anionic surface active agent is selected from the group consisting of compounds having the structure

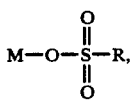

compounds having the structure

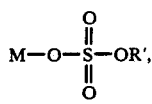

and mixtures thereof, wherein M is a monovalent cation, R is an alkyl, alkenyl or alkaryl group having 10 to 20 carbon atoms, R' is an alkyl, alkenyl or alkaryl group having 10 to 20 carbon atoms or an alkyl polyether group having the structure

wherein R" is an alkyl group having 10 to 20 carbon atoms, R"' is H or an alkyl group having up to 4 carbon atoms, and n is an integer in the range of 1 to 12.

4. The method of claim 1 wherein said surface active agent is an alpha-olefin sulfonate containing 8 to 18 carbon atoms.

5. The method of claim 1 in which said composition additionally comprises a water softening agent.

6. The method of claim 5 wherein the water softening agent is a tripolyphosphate.

7. The method of claim 6 wherein the water softening agent is selected from the group consisting of sodium tripolyphosphate, potassium tripolyphosphate and mixtures thereof.

8. The method of either of claims 1 or 5 wherein the surface active agent is an alphaolefin sulfonate containing 10-16 carbon atoms and the fatty acid component comprises at least one fatty acid having 14-18 carbon atoms.

9. The method of claim 8 wherein said base is a member of the group consisting of sodium hydroxide, potassium hydroxide, ammonium hydroxide, alkylamines, alkanolamines and mixtures thereof.

10. The method of claim 1 wherein the water content of said composition, prior to said diluting step, is about 40 to about 60 percent, based on the total weight of the formulation.

11. An aqueous formulation which can be further diluted with water to form a thixotropic composition comprising an a dry basis;

a. about 15 to about 25 weight percent of an alpha-olefin sulfonate having 12-16 carbon atoms;

b. about 10 to about 20 weight percent of at least one fatty acid having 14-18 carbon atoms;

c. about 10 to about 20 weight percent of a thixotropic thickening agent which is a copolymer of acrylic acid and a polyoxyethylene methacrylic ester;

d. about 5 to about 15 weight percent of polyacrylic acid homopolymer, having an average molecular weight in the range of 40,000 to 100,000; and e. sufficient base to adjust the pH of the formulation to a value of the range of about 8 to 10.

12. The formulation of claim 11 wherein the alpha-olefin sulfonate has 12 to 14 carbon atoms.

13. The formulation of claim 11 wherein the fatty acid is commercial grade stearic acid.

14. The formulation of claim 11 additionally containing 1-4 percent, based on the dry weight of the formulation, of potassium tripolyphosphate.

15. The formulation of claim 11 wherein the alcohol moiety of the ester has the structure

wherein R is an alkyl group having 16-25 carbon atoms; and n is an integer in the range of 18-25.

16. The formulation of claim 11 wherein the base comprises at least one alkanolamine having the structure

wherein $R_1$ is a hydroxyalkylene group having 2-6 carbon atoms and $R_2$ and $R_3$ are independently hydrogen or a hydroxy-alkylene group having 2-6 carbon atoms.

17. The formulation of claim 16 wherein the base is triethanolamine present in an amount of about 30-50 percent, based on the total dry weight of the formulation.

18. The formulation of claim 16 wherein the base is a mixture comprising 75-95 weight percent triethanolamine and 5-25 weight percent diethanolamine, said mixture being present in the formulation at a concentration of about 30-50 percent, based on the dry weight of the formulation.

19. The formulation of any one of claims 11-18 wherein the water content of said formulation is about 40-60 percent, based on the total weight of the formulation.

20. A foamable aqueous composition comprising 85-99 weight percent water and 1-15 weight percent of the formulation of any one of claims 11-18.

21. An aqueous foamable composition comprising, based on the total weight of said composition, a. about 2 to about 8 weight percent of at least one alpha-olefin sulfonate having 12 to 14 carbon atoms, b. about 2 to about 8 weight percent of commercial grade stearic acid, c. about 5 to about 12 weight percent of an alkanolamine, d. about 2 to about 7 weight percent of a thixotropic thickner comprising a copolymer of acrylic acid and an ethoxylated methacrylic ester, e. about 1 to about 5 weight percent of a polyacrylic acid homopolymer, having an average molecular weight in the range of 40,000 to 100,000, and f. about 60 to about 90 weight percent water.

22. The composition of claim 21 additionally containing about 0.25 to about 1 weight percent, based on the total weight of the composition, of potassium tripolyphosphate.

23. The composition of claim 21 wherein the alkanolamine is triethanolamine.

24. The composition of claim 21 wherein the alkanolamine is a mixture comprising 75 to 90 weight percent of triethanolamine and 10 to 25 weight percent of diethanolamine.

25. The method of forming a barrier between a substrate and the atmosphere which comprises applying to the substrate a foam prepared from an aqueous composition comprising 85 to 99 weight percent water and 1 to 15 weight percent of the formulation of any one of claims 11 to 20.

26. A method of forming a barrier between a substrate and the atmosphere which comprises applying to the substrate a foam prepared from an aqueous composition comprising about 85-99 weight percent of water and 1 to 15 weight percent of the foamable composition of any one of claims 21-24.

* * * * *